US011618438B2

(12) United States Patent
Srivatsa et al.

(10) Patent No.: US 11,618,438 B2
(45) Date of Patent: Apr. 4, 2023

(54) THREE-DIMENSIONAL OBJECT LOCALIZATION FOR OBSTACLE AVOIDANCE USING ONE-SHOT CONVOLUTIONAL NEURAL NETWORK

(71) Applicant: International Business Machines Corporation, Armonk, NY (US)

(72) Inventors: Mudhakar Srivatsa, White Plains, NY (US); Swati Rallapalli, Ossining, NY (US); Nidal Qwasmi, Ontario (CA); Mahmood S. Ashek, Ontario (CA); Michael J. Giancola, Southwick, MA (US); Shehzad Noor Taus Priyo, Santa Clara, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 502 days.

(21) Appl. No.: 15/935,195

(22) Filed: Mar. 26, 2018

(65) Prior Publication Data

US 2019/0291723 A1 Sep. 26, 2019

(51) Int. Cl.
*G06T 7/00* (2017.01)
*B60W 30/09* (2012.01)
(Continued)

(52) U.S. Cl.
CPC ............ *B60W 30/09* (2013.01); *G05D 1/0088* (2013.01); *G05D 1/024* (2013.01); *G05D 1/0214* (2013.01);
(Continued)

(58) Field of Classification Search
CPC ............. B60W 30/09; B60W 2420/42; B60W 2420/52; G06T 7/521; G06T 7/11;
(Continued)

(56) References Cited

U.S. PATENT DOCUMENTS 9,760,806 B1 9/2017 Ning et al.
9,886,769 B1* 2/2018 Tremaine ................ G06F 3/017
(Continued)

FOREIGN PATENT DOCUMENTS

CN 106909924 * 6/2017 .......... G06F 16/583
CN 107576960 A 1/2018
(Continued)

OTHER PUBLICATIONS

"Tutorial: Depth Image and Point Cloud Structures I/O," Copyright 2015, Normal ICP.*
(Continued)

*Primary Examiner* — Tyler J Lee
*Assistant Examiner* — Tiffany P Ohman
(74) *Attorney, Agent, or Firm* — Garg Law Firm, PLLC; Rakesh Garg; Anthony Mauricio Pallone

(57) ABSTRACT

Pixel image data of a scene is received in which the pixel image data includes a two-dimensional representation of an object in the scene. Point cloud data including three-dimensional point coordinates of a physical object within the scene corresponding to the two-dimensional representation of the object is received. The three-dimensional point coordinates include depth information of the physical object. The point cloud data is mapped to an image plane of the pixel image data to form integrated pixel image data wherein one or more pixels of the pixel image data have depth information integrated therewith. A three-dimensional bounding box is predicted for the object using a convolutional neural network based upon the integrated pixel image data.

14 Claims, 7 Drawing Sheets

(51) Int. Cl.

| | |
|---|---|
| *G06K 9/62* | (2022.01) |
| *G06T 19/00* | (2011.01) |
| *G06T 7/521* | (2017.01) |
| *G06T 7/11* | (2017.01) |
| *G05D 1/00* | (2006.01) |
| *G05D 1/02* | (2020.01) |
| *G06N 3/08* | (2023.01) |
| *G06V 20/58* | (2022.01) |
| *G06V 20/64* | (2022.01) |

(52) U.S. Cl.
CPC ......... *G05D 1/0221* (2013.01); *G06K 9/6257* (2013.01); *G06K 9/6293* (2013.01); *G06N 3/08* (2013.01); *G06T 7/11* (2017.01); *G06T 7/521* (2017.01); *G06T 19/006* (2013.01); *G06V 20/584* (2022.01); *G06V 20/647* (2022.01); *B60W 2420/42* (2013.01); *B60W 2420/52* (2013.01); *G06T 2207/20164* (2013.01); *G06T 2207/30252* (2013.01); *G06T 2210/12* (2013.01)

(58) Field of Classification Search
CPC ......... G06T 19/006; G06T 2207/20164; G06T 2207/30252; G06T 2210/12; G05D 1/0088; G05D 1/0214; G05D 1/0221; G05D 1/024; G06K 9/00208; G06K 9/00825; G06K 9/6257; G06K 9/6293; G06N 3/08
USPC .......................................................... 701/28
See application file for complete search history.

(56) References Cited

U.S. PATENT DOCUMENTS

| | | | | |
|---|---|---|---|---|
| 10,509,947 | B1* | 12/2019 | Douillard | G06K 9/00208 |
| 2016/0221592 | A1 | 4/2016 | Puttagunta et al. | |
| 2017/0039436 | A1 | 2/2017 | Chen et al. | |
| 2017/0300059 | A1 | 10/2017 | Rust | |
| 2017/0329331 | A1 | 11/2017 | Gao | |
| 2018/0314911 | A1* | 11/2018 | Eldar | G06K 9/00375 |

FOREIGN PATENT DOCUMENTS

| | | |
|---|---|---|
| WO | 2016100814 A1 | 6/2016 |
| WO | 2017157967 A1 | 9/2017 |

OTHER PUBLICATIONS

Kan Ren Fang, "Automatic registration of airborne LiDAR point cloud data and optical imagery depth map basedon line and points features," Jun. 2015, ScienceDirect, whole document.*
Pavel Chmelara, Ladislav Beran and Lubos Rejfek, "The Depth Map Construction from a 3D Point Cloud," 2016, MATEC Web of Conferences 7, 03005 (2016), whole document.*
English Translations of CN-106909924 by DERWENT and by PatentScope, 2017 (Year: 2017).*
Chen, "Multi-View 3D Object Detection Network for Autonomous Driving." (Submitted on Nov. 23, 2016 (v1), last revised Jun. 22, 2017 (this version, v3)), https://arxiv.org/abs/1611.07759.
L. Tai, "A deep-network solution towards model-less obstacle avoidance," 2016 IEEE/RSJ International Conference on Intelligent Robots and Systems (IROS), Daejeon, 2016, pp. 2759-2764.
Z. Wang, "Fusing Bird View LIDAR Point Cloud and Front View Camera Image for Deep Object Detection." (Submitted on Nov. 17, 2017 (v1), last revised Nov. 29, 2017 (this version, v2)) https://arxiv.org/abs/1711.06703.
D. Maturana, "VoxNet: A 3D Convolutional Neural Network for real-time object recognition," 2015 IEEE/RSJ International Conference on Intelligent Robots and Systems (IROS), Hamburg, 2015, pp. 922-928, 2015.
M. Tomizuka, "Project Status Report for Berkeley Deep Drive. Lidar and Camera Fusion for 3D Object Detection based on Deep Net for Autonomous Driving." Mechanical Engineering Department University of California, Berkeley. Nov. 27, 2017. https://deepdrive.berkeley.edu/system/files/project/document/BDD%20Status%20Report%202017_Tomizuka_LidarCameraFusion%20%282%29.pdf.
S. Oh, "Object Detection and Classification by Decision-Level Fusion for Intelligent Vehicle Systems." Sensors, 17, 207 (21 pages), Published: Jan. 22, 2017.
N. Patel, "Sensor Modality Fusion with CNNs for UGV Autonomous Driving in Indoor Environments." Proceedings of the 2017 IEEE/RSJ International Conference on Intelligent Robots and Systems, (Vancouver, Canada), Sep. 24-28, 2017.
D. Matti, "Combining LIDAR Space Clustering and Convolutional Neural Networks for Pedestrian Detection." (Submitted on Oct. 17, 2017) https://arxiv.org/abs/1710.06160.
S. Lee, "Rich feature hierarchies from omni-directional RGB-DI information for pedestrian detection," 2015 12th International Conference on Ubiquitous Robots and Ambient Intelligence (URAI), Goyang, 2015, pp. 362-367.
C. Premebida, "Pedestrian detection combining RGB and dense LIDAR data," 2014 IEEE/RSJ International Conference on Intelligent Robots and Systems, Chicago, IL, 2014, pp. 4112-4117.
Qi et al., Frustum PointNets for 3D Object Detection from RGB-D Data, Nov. 22, 2017.
P201703894CN01, Application No. 201910206899.5, OA1, Nov. 2, 2022.

* cited by examiner

THREE-DIMENSIONAL OBJECT LOCALIZATION FOR OBSTACLE AVOIDANCE USING ONE-SHOT CONVOLUTIONAL NEURAL NETWORK

TECHNICAL FIELD

The present invention relates generally to a method, system, and computer program product for object localization for obstacle avoidance. More particularly, the present invention relates to a method, system, and computer program product for three-dimensional object localization for obstacle avoidance using a one-shot convolutional neural network with selective sampling of LIDAR/IR sensors.

BACKGROUND

Three-dimensional (3D) object localization is a process of processing image data to detect, identify, and/or determine the size of three-dimensional objects contained in an image. 3D object localization and size estimation is important in many diverse applications such as obstacle avoidance for self-driving cars, robot navigation, or estimating the size of livestock. Traditional systems to perform 3D object localization typically work either directly on point cloud information obtained from a Light Detection and Ranging (LIDAR) system or IR sensors, or use a multi-stage processing pipeline which utilizes a region proposal neural network for proposing regions with a probability of containing an object of interest followed by object classification to classify the object. Point cloud information refers to a set of 3D coordinates, usually X, Y, and Z coordinates, used to represent a 3D object within a scene. However, these traditional systems are limited by the fact that point cloud information does not capture red-green-blue (RGB) pixel information and are computationally complex due to the many region proposals that are generated.

SUMMARY

The illustrative embodiments provide a method, system, and computer program product. An embodiment of a method includes receiving pixel image data of a scene. In the embodiment, the pixel image data including a two-dimensional representation of an object in the scene. The embodiment further includes receiving point cloud data including three-dimensional point coordinates of a physical object within the scene corresponding to the two-dimensional representation of the object, the three-dimensional point coordinates include depth information of the physical object. The embodiment further includes mapping the point cloud data to an image plane of the pixel image data to form integrated pixel image data wherein one or more pixels of the pixel image data have depth information integrated therewith. The method further includes predicting a three-dimensional bounding box for the object using a convolutional neural network based upon the integrated pixel image data.

An embodiment further includes segmenting the three-dimensional bounding box of the object to form a segmented object. An embodiment further includes estimating an object size of the segmented object. An embodiment further includes computing path information of the object based upon the object size. An embodiment further includes sending the path information of an automotive control system, the path information instructing the automotive control system to avoid the object.

An embodiment further includes interpolating the point cloud data to each of the pixels of the image data such that each pixel of the image data has an associated depth value integrated therewith. An embodiment further includes predicting an object classification for the object using the convolutional neural network based upon the integrated pixel image data. In an embodiment, the pixel image data is received from a camera device and the point cloud data is received from a point cloud capture device.

An embodiment further includes determining that reorientation of one or more of the camera device and the point cloud capture device is required based upon a threshold value, and computing reorientation information instructing one or more of the camera device and the point cloud capture device to reorient to a different capture angle. An embodiment further includes sending the reorientation information to one or more of the camera device and the point cloud capture device. In am embodiment, the convolutional neural network is a single stream convolutional neural network.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
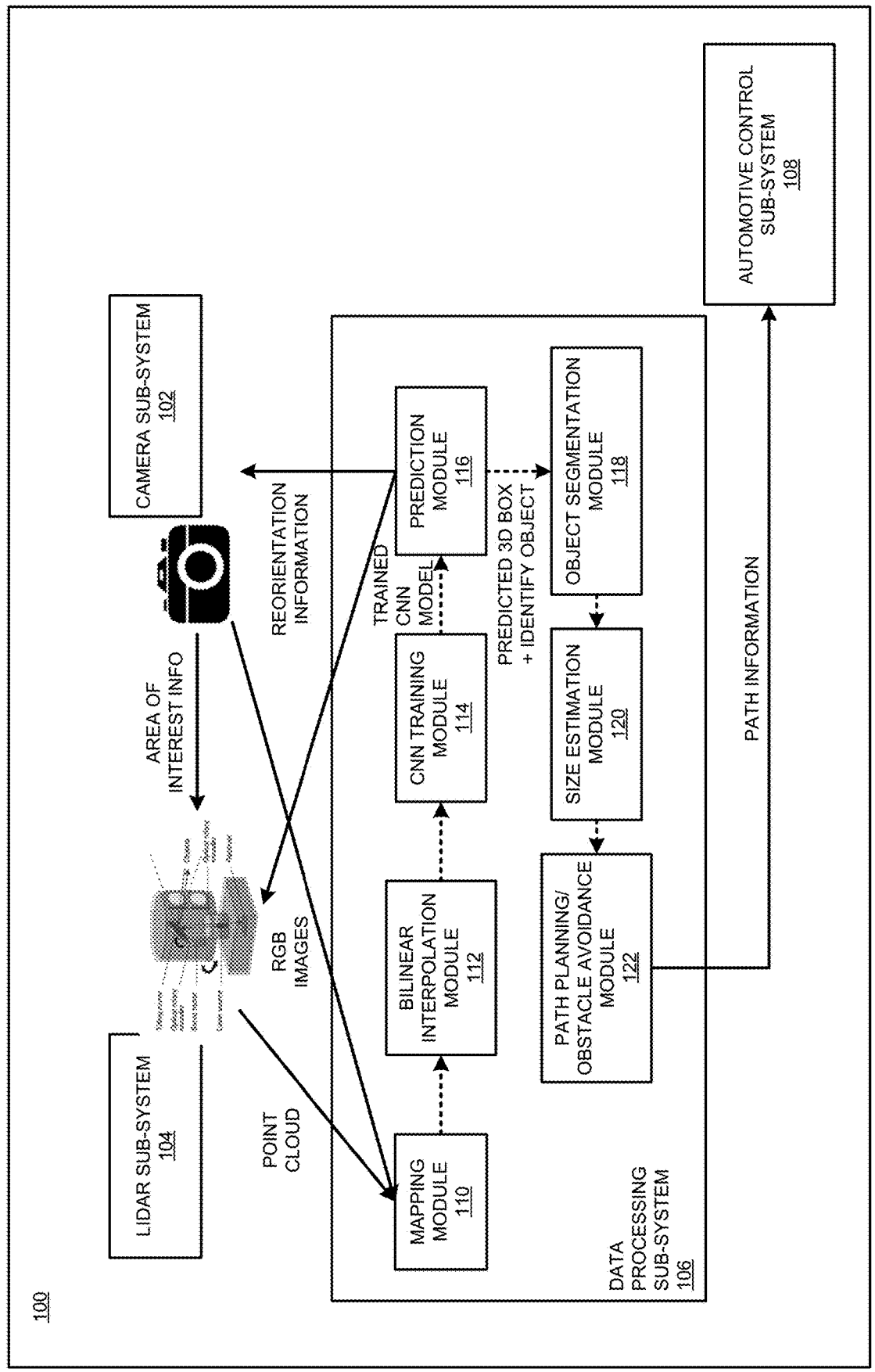
FIG. 1 depicts a block diagram of a network of data processing systems in which illustrative embodiments may be implemented.

The illustrative embodiments described herein generally relate to three-dimensional object localization for obstacle avoidance using a one-shot convolutional neural network. Traditional object localization systems obtain LIDAR data without selective subsampling. In one or more embodiments, a camera captures pixel images data of a scene and a LIDAR subsystem, IR sensors, or another suitable point cloud data collection device captures point cloud data of the same scene. One or more embodiments described herein map the point cloud data to the image plane to form integrated RGB image data having depth (RGBD) information and process the RGBD information using a one-shot convolutional neural network (CNN) to extract features from the RGBD image data to be used for 3D localization. In one or more embodiments fast object size estimation is enabled for path planning and object avoidance. In some embodiments, in situations in which a particular camera or LIDAR angle does not capture an object completely, re-positioning information is calculated and sent to one or more of the camera subsystem and LIDAR subsystem instructing the particular subsystem to reposition the camera/LIDAR angle of capture.

An Artificial Neural Network (ANN)—also referred to simply as a neural network—is a computing system made up of a number of simple, highly interconnected processing elements (nodes/filters), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior. A feedforward neural network is an artificial neural network where connections between the units do not form a cycle.

In machine learning, a convolutional neural network (CNN) is a type of feed-forward artificial neural network in which the connectivity pattern between its nodes (neurons/filters) is inspired by the organization of the animal visual cortex, whose individual neurons are arranged to respond to overlapping regions tiling a visual field. Convolutional networks mimic biological processes and are configured as variations of multilayer perceptrons designed to use minimal amounts of preprocessing while processing data, such as digital images.

Convolutional neural networks (CNN) are networks with overlapping "reception fields" performing convolution tasks. A CNN is particularly efficient in recognizing image features, such as by differentiating pixels or pixel regions in a digital image from other pixels or pixel regions in the digital image. Generally, a CNN is designed to recognize images or parts of an image, such as detecting the edges of an object recognized on the image. Computer vision is a field of endeavor where CNNs are commonly used. In one or more embodiments, one-shot CNN is a methodology in which a single pass of one CNN trunk is enough to localize as well as classify an object using both camera data and point cloud data (e.g., LIDAR data) as further described herein.

One or more embodiments capture RGBD information using a one-shot CNN with selective sampling of sensor information for in-time obstacle avoidance. Various embodiments describe processes, systems, and method for selective sampling of LIDAR based on RGBD channels to represent a scene, using a one-shot CNN for 3D object localization resulting in a novel realization of neuron connectivity, and analyzing 3D boxes to reorient a LIDAR system and camera if necessary, and apply 3D object localization to object size estimation and obstacle avoidance.

In one or more embodiments, an end-to-end process is described to collect RGB image data of a scene from a camera subsystem, selectively sample point cloud data of the scene using a LIDAR subsystem or IR sensors, map the point cloud data to the image plane, use a one stream CNN to fuse the RGB image data and point cloud data to simultaneously identify an object as well as regress over its 3D coordinates, segment the object based on clustering, estimate the size of the object, and enable movement of an automotive control subsystem within an automobile to avoid obstacles in time. One or more embodiments are more efficient than existing systems that use region proposals followed by classification such that obstacles can be actively avoided via efficient detection of the objects.

In an embodiment of a process for three-dimensional object localization for obstacle avoidance, a camera subsystem of an automobile captures RGB image data of a scene including x, y pixel coordinates. In the embodiment, a point cloud capture subsystem, such as a LIDAR device or IR sensors, capture point cloud data including X, Y, Z physical point coordinates (for example, in meters) of physical 3D objects within the scene. Capturing point cloud information uniformly in all directions is expensive and may lead to sparse data in important spaces of a scene. In the embodiment, the camera subsystem analyzes RGB frames captured at a high frame rate to identify areas of interest in the scene, determines orientation information for the LIDAR, and transmits information to the LIDAR to direct the LIDAR subsystem to orient a capture and sample with high frequency at scene locations in which the areas of interest are found in the RGB image data.

In the embodiment, a data processing subsystem maps the point cloud data to the image plane by transforming the point cloud points to camera coordinates and projecting the points to 2D images. In an embodiment, the data processing subsystem calculates a transform between RGB image data from the camera at the time of capture and point cloud data at a time the depth cloud information was captured by the LIDAR to account for the difference and time and frame of reference for the two sensors. In the embodiment, the point cloud point is projected to the image plane to obtain corresponding pixel coordinates. In a particular embodiment, given a 3D point (X, Y, Z) in point cloud coordinates, the corresponding pixel coordinates (x, y) are:

$$x = X/Z * f_x * rd/ru + cx$$

$$y = Y/Z * f_y * rd/ru + cy$$

The normalized radial distance ru is given by: $ru = sqrt((X^2 + Y^2)/(Z^2))$. The value of rd depends on the 3 distortion coefficients k1, k2 and k3: $rd = ru + k1 * ru^3 + k2 * ru^5 + k3 * ru^7$. The variables fx and fy represent focal lengths, and cx and cy represent camera coefficients.

In the embodiments, the data processing subsystem compensates for sparsity of point cloud data by performing bilinear interpolation to obtain point cloud point information at every pixel of the RGB data to obtain RGBD image data in which each pixel of the RGB image data has an associated depth value. In a particular embodiment, the data processing subsystem uses a KDTree-like index-based search for efficiently obtaining a nearest pixel with point cloud information.

In the embodiment, the data processing system uses a single stream CNN pipeline to process the RGBD image data and predict an object class of one or more objects in the image data and 3D bounding box coordinates surrounding each object. In particular embodiments, the use of a single stream CNN pipeline to fuse the RGB and point cloud information allows the storage of significantly fewer parameters on disk as well as provides for high inference speed. In the embodiment, the data processing subsystem processes the 3D bounding box and orientation of the object to determine if certain faces of the object are not clear (e.g., too small), and instructs the camera and LIDAR subsystems to reorient themselves to a different capture angle to recapture one or more of the image data and the point cloud data to obtain more favorable data for processing using the CNN. In one or more embodiments, after the 3D bounding box is obtained, the data processing subsystem determines if the LIDAR and camera need to be reoriented to get better estimates of object pose based on 3D face sizes and confidence values of the prediction of the bounding box.

In the embodiment, the data processing subsystem segments each object to obtain an accurate object size by clustering the pixels using depth information to compute pixel distance. In a particular embodiment, pixel distance is a weighted combination of a difference in the depth and R, G, B values. In the embodiment, the data processing subsystem estimates the size of a segmented object based upon distance between extreme points in the image data. In the embodiment, the data processing subsystem uses the size estimate of the object for path planning to generate path information to instruct the automotive control system to avoid obstacles based on the distance and size of the object. Although various embodiments are described as being used for obstacle avoidance for self-driving vehicles, it should be understood that the principles described herein may be used for other applications such as measuring livestock, augmented reality applications, or robot navigation.

The illustrative embodiments are described with respect to certain types of 3D object localization, neural networks, transmissions, validations, responses, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
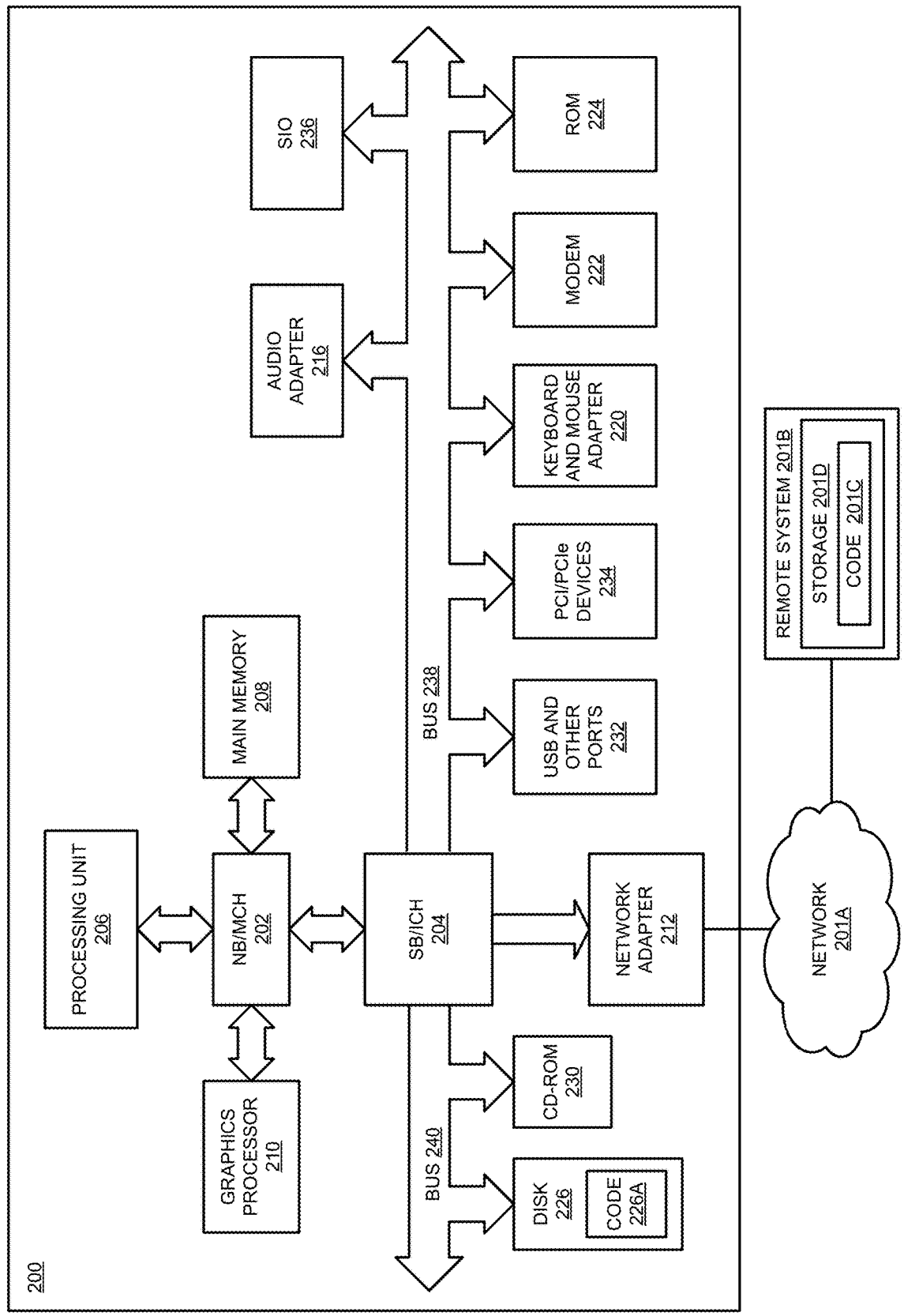
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing subsystems in which illustrative embodiments may be implemented. Data processing environment 100 is a network of subsystems in which the illustrative embodiments may be implemented. Data processing environment 100 includes a camera subsystem 102, a LIDAR subsystem 104, a data processing subsystem 106, and an automotive control subsystem 108. In one or more embodiments, data processing environment 100 is installed within and/or on an automobile such as a car. In one or more embodiments, a network provides communications links between various devices and computers connected together within data processing environment 100. The network may include connections, such as wire, wireless communication links, or fiber optic cables.

Software applications may execute on any computer in data processing environment 100. A data processing system, such as data processing subsystem 106 may contain data and may have software applications or software tools executing thereon.

Only as an example, and without implying any limitation to such architecture, FIG. 1 depicts certain components that are usable in an example implementation of an embodiment. As another example, an embodiment can be distributed across several data processing systems and a data network as shown, whereas another embodiment can be implemented on a single data processing system within the scope of the illustrative embodiments. Camera subsystem 102, LIDAR subsystem 104, data processing subsystem 106, and automotive control subsystem 108 also represent example nodes in a cluster, partitions, and other configurations suitable for implementing an embodiment.

Data processing subsystem 106 implements an embodiment of a neural network, such as a convolutional neural network, described herein. In the embodiment, data processing subsystem 106 includes a mapping module 110, a bilinear interpolation module 112, a CNN training module 114, a prediction module 116, an object segmentation module 118, a size estimation module 120, and a path planning/obstacle avoidance module 122. In particular embodiments, one or more of mapping module 110, a bilinear interpolation module 112, a CNN training module 114, a prediction module 116, an object segmentation module 118, a size estimation module 120, and a path planning/obstacle avoidance module 122 may be contained within a software application.

In the embodiment, camera subsystem 102 includes a camera configured to obtain RGB image information including x, y, z pixel coordinates from a scene. Camera subsystem 102 further analyzes the RGB information to determine one or more areas of interest om the RGB information and sends the area of interest information to LIDAR subsystem 104. Camera subsystem 102 is further configured to orient the camera based upon reorientation instructions received from data processing subsystem 106. Camera subsystem 102 is further configured to send the RGB image information to data processing subsystem 106.

In the embodiment, LIDAR subsystem 104 is configured to obtain point cloud information including X, Y, Z coordinates of the scene based upon angle/area of interest information received from camera subsystem 102. LIDAR subsystem 104 is further configured to reorient the LIDAR based upon the area of interest information received from camera subsystem 102 and/or reorientation information received from data processing subsystem 106. LIDAR subsystem 104 is further configured to send the point cloud information to data processing subsystem 106.

Mapping module 110 of data processing system maps the point cloud data to the image plane by transforming the point cloud points to camera coordinates and projecting the points to 2D images. Bilinear interpolation module 112 performs bilinear interpolation to obtain point cloud point information at every pixel of the RGB data to obtain RGBD image data in which each pixel of the RGB image data has an associated depth value.

CNN training module 114 provides a trained CNN model to prediction module 116. Prediction module 116 uses a single stream CNN pipeline to process the RGBD image data and predict an object class of one or more objects in the image data and 3D bounding box coordinates surrounding each object. In the embodiment, Prediction module 116 processes the 3D bounding box and orientation of the object to determine if certain faces of the object are not clear (e.g., too small), and sends reorientation information to camera subsystem 102 and LIDAR subsystem 104 to instruct the camera and LIDAR to reorient themselves to a different angle to recapture one or more of the image data and the point cloud data to obtain more favorable data for processing using the CNN.

In the embodiment, object segmentation module 118 segments the 3D bounding box each object to obtain an object size of each object by clustering the pixels using depth information to compute pixel distance. In a particular embodiment, pixel distance is a weighted combination of a difference in the depth and R, G, B values. In the embodiment, size estimation module 120 estimates the size of a segmented object based upon distance between extreme points in the 3D bounding box of the segmented image data. In the embodiment, path planning/obstacle avoidance module 122 uses the size estimate of the object to generate path information and send the path information to automotive control subsystem 108. The path information instructs automotive control system 108 to avoid obstacles based on the distance and size of the object. In particular embodiments, automatic control subsystem may control one or more of a speed, acceleration, or direction of the automobile.

In the depicted example, data processing environment 100 may be the Internet. The network may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing subsystem 106 in FIG. 1 in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
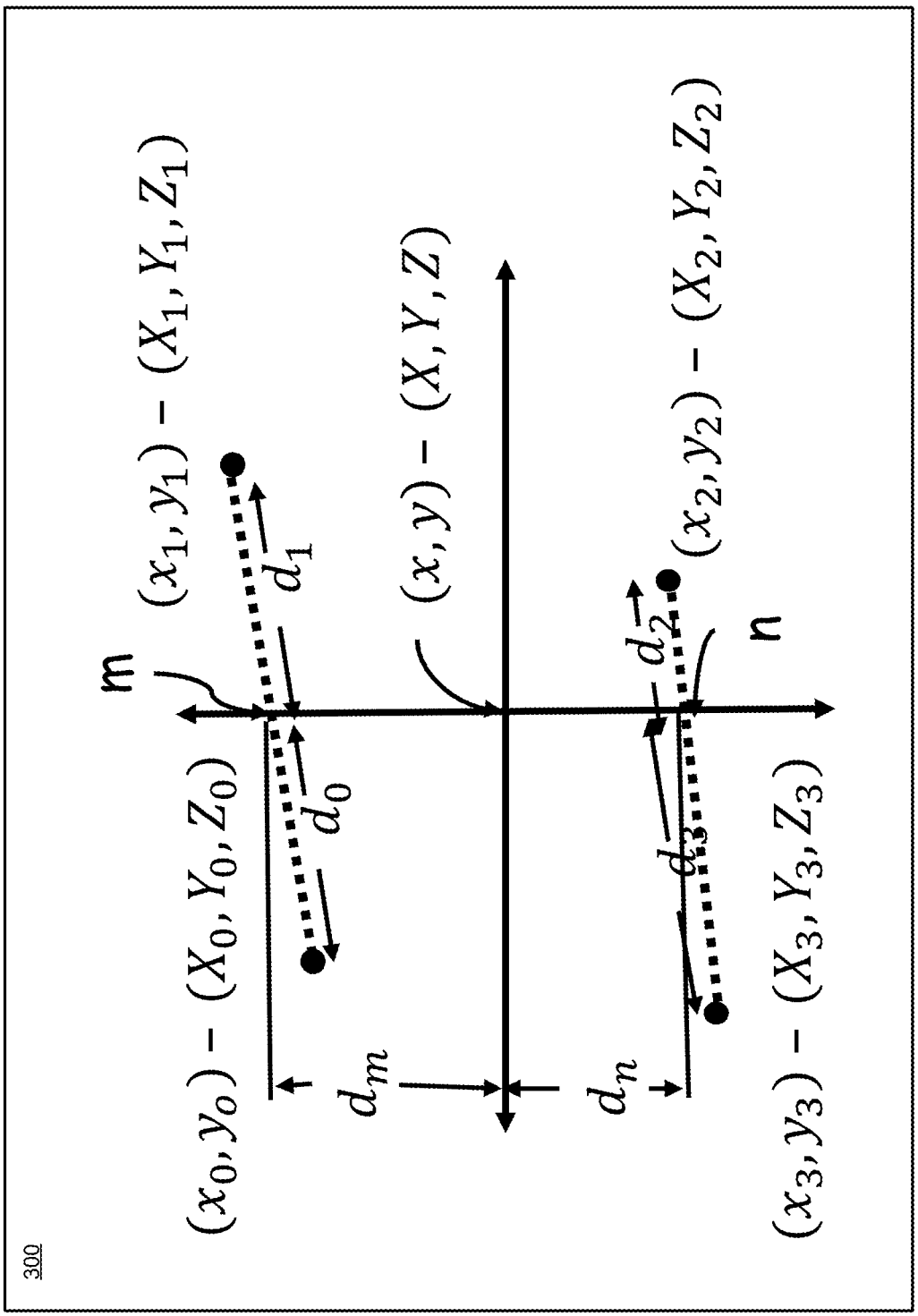
FIG. 3 depicts an example bilinear interpolation process in accordance with an illustrative embodiment.

With respect to FIG. 3, this figure depicts an example bilinear interpolation process 300 in accordance with an illustrative embodiment. After mapping of the point cloud points to image pixels, some of the image pixels may not have corresponding depth data from the point cloud data due to a lower sampling interval for the point cloud data as compared to the image data. In other situations, depth data may be missing from the point cloud data due to the presence of an object for which it is difficult to obtain point cloud data such as a black metallic object or a glass object. Accordingly, in one or more embodiments data processing subsystem 106 performs bilinear interpolation of the point cloud data to each pixel of the image data to obtain depth information for each pixel of the image data. In the example of FIG. 3, x, y represents coordinates of a pixel and X, Y, Z represents coordinates of a point cloud point of a real world object. To find the point cloud point (X, Y, Z) corresponding to a pixel (x, y), data processing subsystem 106 finds the closest point in each of the four quadrants centered at (x,y) that have associated point cloud points using a KDTree algorithm. The four closest pixels that are are represented by $(x_0,y_0)$, $(x_1,y_1)$, $(x_2,y_2)$, $(x_3, y_3)$ having associated point cloud points$(X_0,Y_0,Z_0)$, $(X_1,Y_1,Z_1)$, $(X_2,Y_2,Z_2)$, $(X_3,Y_3,Z_3)$.

The interpolation process further includes finding the values m and n and determining a pixel coordinates $(x_m, y_m)$ as follows:

$$x_m = x_n = x$$

$$y_m = y_0 + (x-x_0)*(y_1-y_0)/(x_1-x_0)$$

$$y_n = y_3 + (x-x_3)*(y_2-y_0)/(x_2-x_3)$$

The interpolation process further includes determining point cloud point (X, Y, Z) corresponding to pixel coordinates $(x_m, y_m)$ using linear interpolation.

Figure 4:
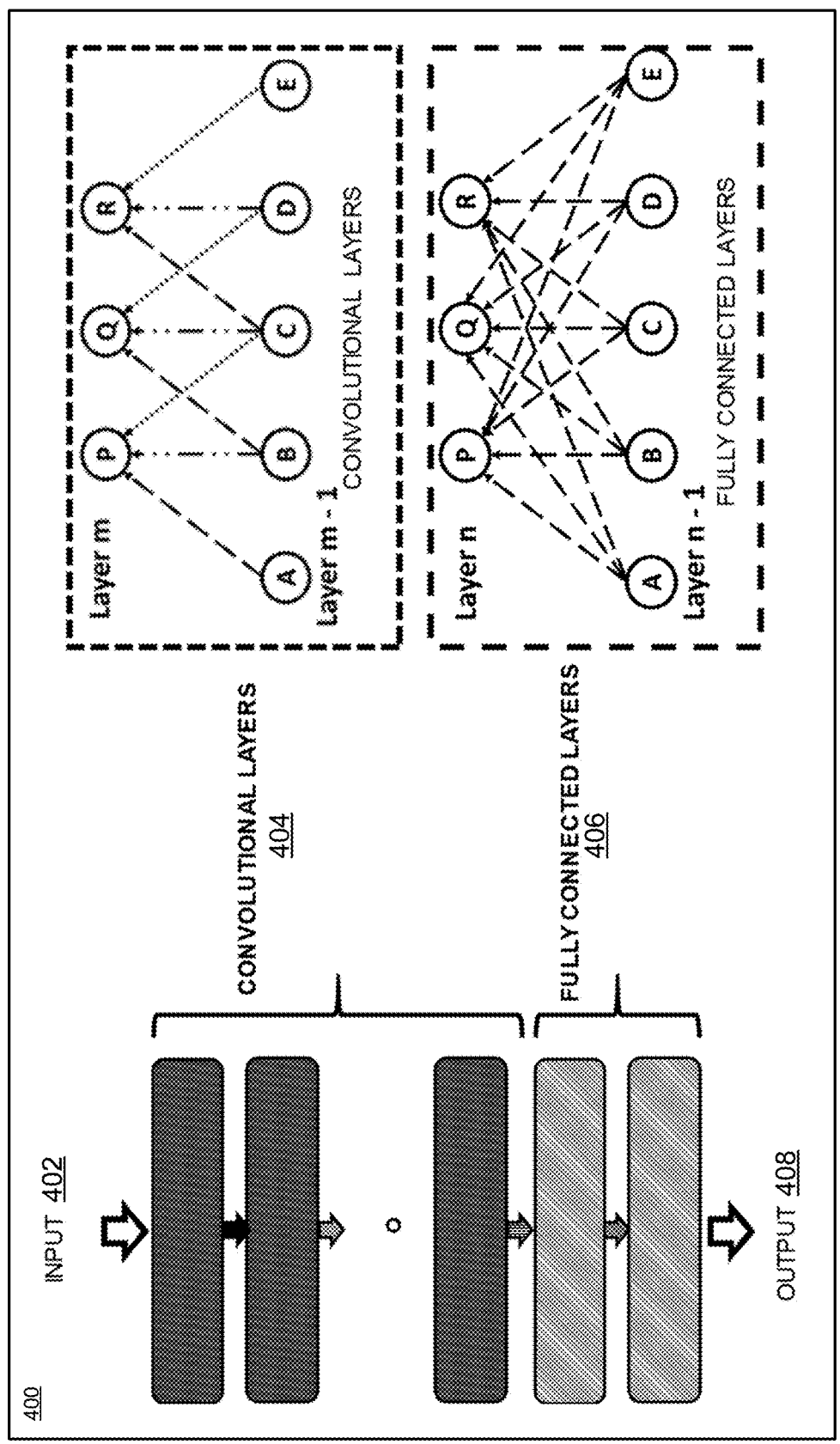
FIG. 4 depicts an example convolutional neural network (CNN) structure in accordance with an illustrative embodiment.

With respect to FIG. 4, this figure depicts an example convolutional neural network (CNN) structure 400 in accordance with an illustrative embodiment. CNN structure 400 includes an input 402, a number of convolutional layers 404, a number of fully connected layers 406, and an output 408. Convolutional layers 404 compute the output of neurons that are connected to local regions in the input, each computing a dot product between their weights and a small region they are connected to in the input. In the example, input 402 receives RGBD data and provides the RGBD data to convolutional layers 404. In the embodiment, convolutional layers 404 extract features, such as objects, from the RGBD data and fully connect layers 406 classify the objects. In particular embodiments, convolutional layers 404 and fully connected layers 406 are trained using a large amount of training data and are able to improve accuracy over other models since they are able to represent nonlinearities that might be present in the data. Output 408 outputs 3D bounding box coordinates and classification probabilities of one or more objects. The classification probabilities include probabilities of an object classification of an object such as whether the object is an automobile, a sign, a tree, or a person.

Figure 5:
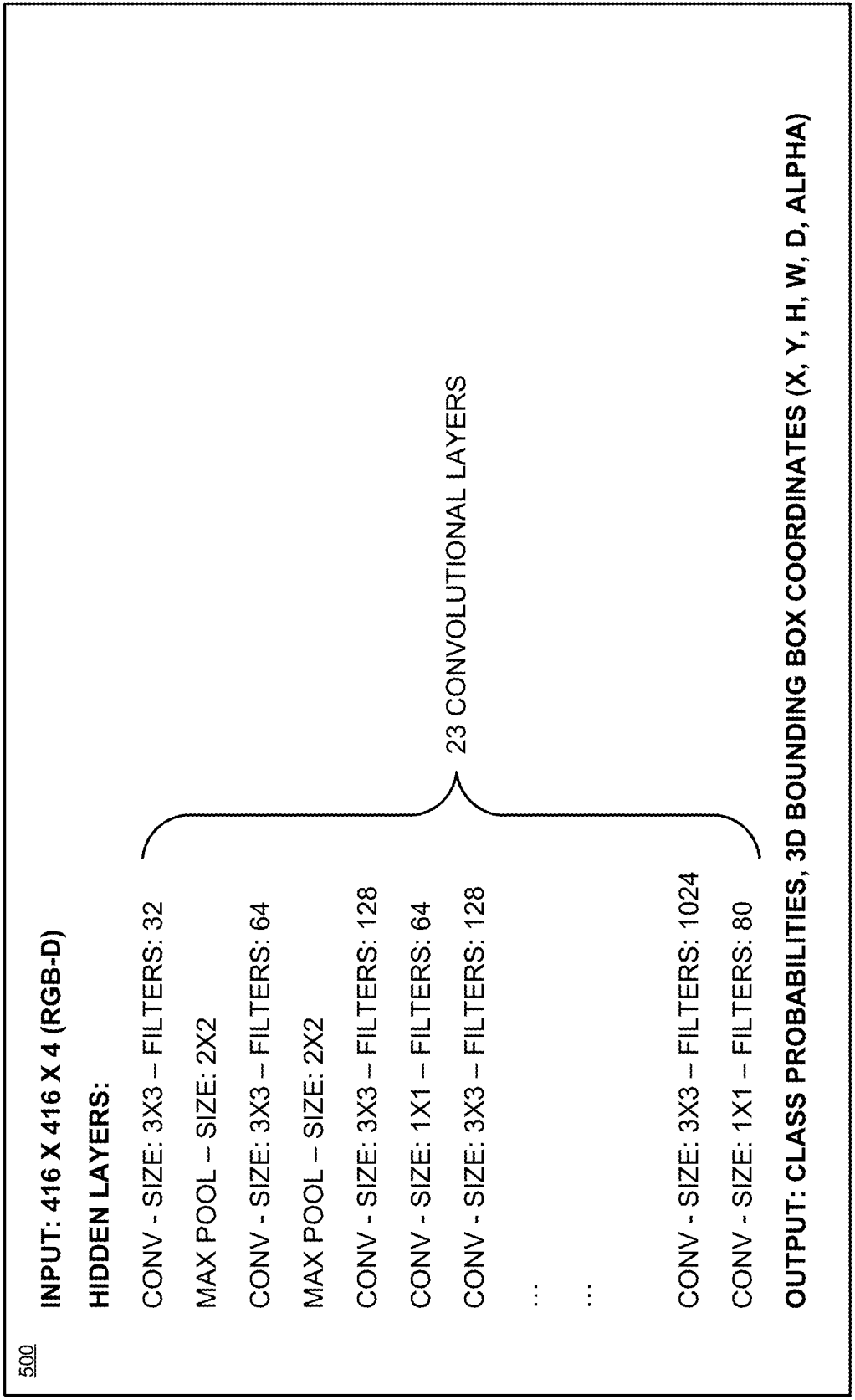
FIG. 5 depicts an example convolutional neural network (CNN) in accordance with an illustrative embodiment.

With respect to FIG. 5, this figure depicts an example convolutional neural network (CNN) 500 in accordance with an illustrative embodiment. CNN 500 includes a 416×416×4 (RGBD) input which includes an array of 416 pixels by 416 pixels in which each pixel includes red (R), green (G), blue (B), and depth (D) values. Hidden layers of CNN 500 include 23 convolutional layers of varying sizes and filters and a number of max pooling layers. The max pooling layers combine the outputs of neuron clusters of one layer into a single neuron in the next layer. In the embodiment, the output of CNN 500 includes class probabilities and 3D bounding box coordinates for one or more objects found in the RGBD input data. In particular embodiments, the 3D bounding box coordinates include x, y, height (h), width (w), depth (d), and an angle (alpha) specifying the dimensions and orientation of the 3D bounding box.

Figure 6:
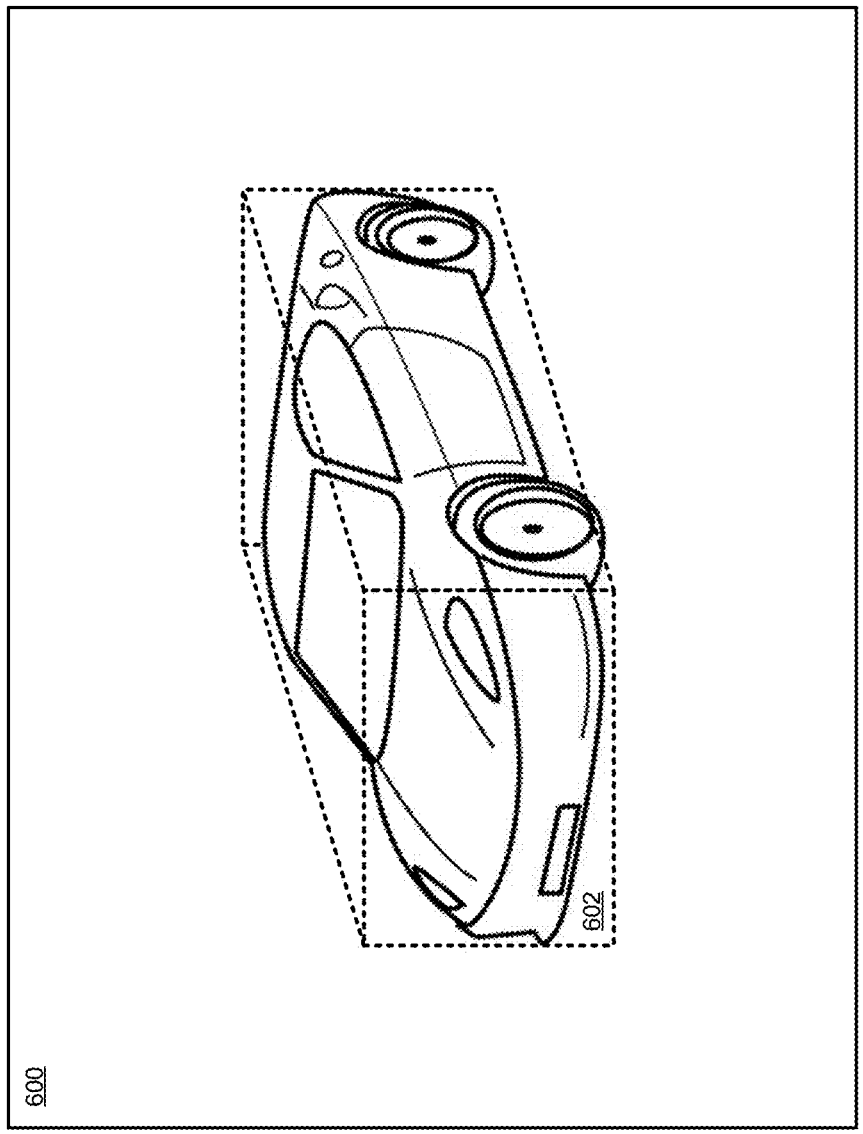
FIG. 6 depicts an example of a 3D bounding box output of the CNN according to an illustrative embodiment.

With respect to FIG. 6, this figure depicts an example of a 3D bounding box output of the CNN according to an illustrative embodiment. In the embodiment of FIG. 6, a bounding box 602 is output by the CNN to identify boundaries of an automobile detected in the RGBD data.

Figure 7:
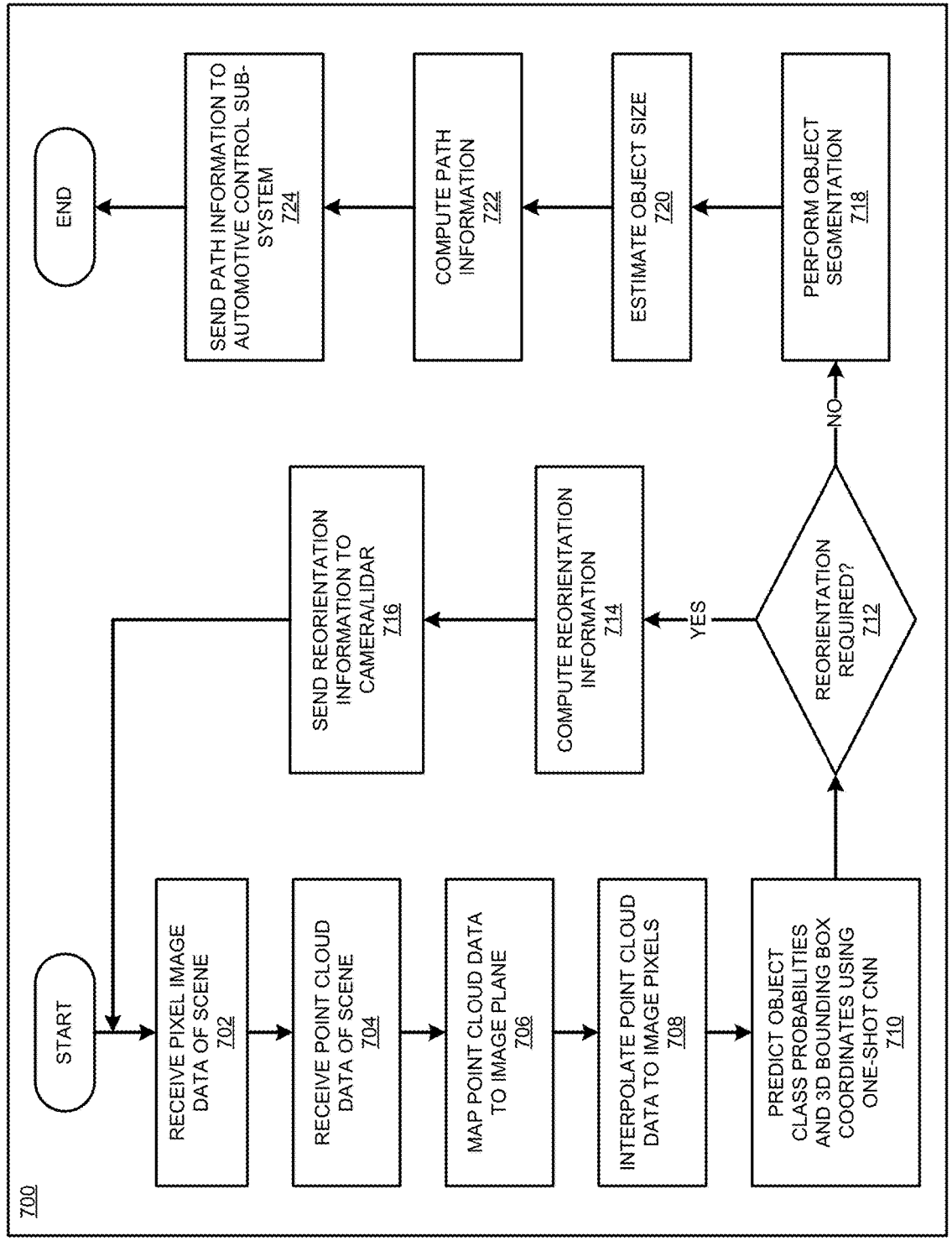
FIG. 7 depicts a flowchart of an example process for three-dimensional object localization for obstacle avoidance using a one-shot convolutional neural network (CNN).

With respect to FIG. 7, this figure depicts a flowchart of an example process 700 for three-dimensional object localization for obstacle avoidance using a one-shot convolutional neural network (CNN). In one or more embodiments, process 700 can be implemented in an application of data processing subsystem 106.

In 702, data processing subsystem 106 receives pixel image data of a scene from a camera of camera subsystem 102. In a particular embodiment, the pixel image data includes RGB image data for a number of x, y pixel coordinates. In 704, data processing subsystem 106 receives point cloud data of the scene from a point cloud capture subsystem/device, such as a LIDAR device or IR sensors. In particular embodiments, the point cloud data includes X, Y, Z physical point coordinates (for example, in meters) of one or more physical 3D objects within the scene. In a particular embodiment, the camera subsystem analyzes RGB frames captured at a high frame rate and directs the LIDAR subsystem to sample with high frequency at scene locations in which objects of interest are found in the RGB image data.

In 706, data processing subsystem 106 maps the point cloud data to the image plane by transforming the point cloud points to camera coordinates and projecting the point cloud points to 2D images of the pixel data. In 708, data processing subsystem 106 interpolates the point cloud data to each of the image pixels such that each pixel of the image data has an associated depth value. In a particular embodiment, data processing subsystem 106 performs bilinear interpolation to obtain point cloud point information at every pixel of the RGB data to obtain RGBD image data in which each pixel of the RGB image data has an associated depth value. In a particular embodiment, the data processing subsystem uses a KDTree-like index based search for efficiently obtaining a nearest pixel with point cloud information.

In 710, data processing subsystem 106 predicts object class probabilities and 3D bounding box coordinates of one or more objects in the image data including the depth information using a CNN. In particular embodiments, the CNN is a one-shot of single stream CNN. In 712, data processing subsystem 106 determines if reorientation of one or more of the camera device and point cloud capture device (e.g., LIDAR) is required based upon a threshold value such as if certain faces of the object are not clear (e.g., too small). If reorientation is required, in 714 data processing subsystem 106 computes reorientation information instructing one or more of the camera device and point cloud capture device to reorient themselves to a different angle. In 716, data processing subsystem 106 sends the reorientation information to one or more of the camera and point cloud capture device. Responsive to receiving the reorientation information, one or more of the camera and point cloud capture device reorients a capture angle to recapture one or more of the image data and the point cloud data to obtain more favorable data for processing using the CNN.

If reorientation is not required, in 718 data processing subsystem 106 segments the 3D bounding box of each object to form a segmented object by clustering the pixels using depth information to compute pixel distance. In a particular embodiment, pixel distance is a weighted combination of a difference in the depth and R, G, B values. In 720, data processing subsystem 106 estimates the size of a segmented object based upon distance between extreme points in the image data. In 722, data processing subsystem 106 computes path information using the size estimate of the object to instruct automotive control system 108 to avoid the objects based on the distance and size of the object. In 724, data processing subsystem 106 sends the path information to automotive control subsystem 108. Responsive to receiving the path information, automotive control subsystem 108 is configured to control one or more systems of the automobile to avoid one or more of the objects. Process 700 is ended thereafter. Although various embodiments are described as being used for obstacle avoidance for self-driving vehicles, it should be understood that the principles described herein may be used for other applications such as measuring livestock, augmented reality applications, or robot navigation.

Thus, a computer implemented method, system or apparatus, and computer program product are provided in the illustrative embodiments for three-dimensional object localization for obstacle avoidance using a one-shot convolutional neural network. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
determining, by analyzing two-dimensional image data of a scene received from a camera device, an area of interest within the scene, the two-dimensional image data comprising red-green-blue (RGB) pixel information at a set of two-dimensional pixel coordinates, the two-dimensional image data captured at a first time from a first frame of reference;
capturing, using a point cloud capture device at a second time later than the first time, from a second frame of reference, point cloud data of the area of interest, the point cloud data comprising a set of three-dimensional physical point coordinates of a physical object in the area of interest;
transforming, using a transformation, three-dimensional physical point coordinates of the point cloud data to corresponding pixel coordinates of the two-dimensional image data, the transformation accounting for a difference between the first time and the second time and a difference between the first frame of reference and the second frame of reference, the transforming generating depth data for a subset of the two-dimensional image data;
performing a bilinear interpolation of the depth data from pixels in the subset of the two-dimensional image data to each pixel in the two-dimensional image data, the bilinear interpolation generating RGBD image data comprising the two-dimensional image data and depth data corresponding to each pixel in the two-dimensional image data;
generating, by inputting the RGBD image data to a set of convolutional layers of a convolutional neural network (CNN), extracted feature data, the extracted feature data comprising an output from the set of convolutional layers;
generating, by inputting the extracted feature data to a set of fully connected layers of the CNN, a set of classification probabilities and a set of three-dimensional bounding box coordinates, the set of classification probabilities and the set of three-dimensional bounding box coordinates comprising an output from the set of fully connected layers;
determining that reorientation of one or more of the camera device and the point cloud capture device is required based upon a threshold value;
computing reorientation information instructing one or more of the camera device and the point cloud capture device to reorient to a different capture angle; and
causing, using the reorientation information, the one or more of the camera device and the point cloud capture device to reorient to a different capture angle.

2. The method of claim 1, further comprising:
forming, by clustering pixels of the set of three-dimensional bounding box coordinates, a segmented object.

3. The method of claim 2, further comprising:
estimating, based upon a distance between extreme points in the image data, an object size of the segmented object.

4. The method of claim 3, further comprising:
computing, using the object size, path information for an automotive control subsystem, the path information enabling the automotive control subsystem to avoid the physical object.

5. A computer usable program product comprising one or more computer-readable storage media, and program instructions stored on at least one of the one or more storage media, the stored program instructions when executed by a processor causing operations comprising:
determining, by analyzing two-dimensional image data of a scene received from a camera device, an area of interest within the scene, the two-dimensional image data comprising red-green-blue (RGB) pixel information at a set of two-dimensional pixel coordinates, the two-dimensional image data captured at a first time from a first frame of reference;
capturing, using a point cloud capture device at a second time later than the first time, from a second frame of reference, point cloud data of the area of interest, the point cloud data comprising a set of three-dimensional physical point coordinates of a physical object in the area of interest;
transforming, using a transformation, three-dimensional physical point coordinates of the point cloud data to corresponding pixel coordinates of the two-dimensional image data, the transformation accounting for a difference between the first time and the second time and a difference between the first frame of reference and the second frame of reference, the transforming generating depth data for a subset of the two-dimensional image data;
performing a bilinear interpolation of the depth data from pixels in the subset of the two-dimensional image data to each pixel in the two-dimensional image data, the bilinear interpolation generating RGBD image data comprising the two-dimensional image data and depth data corresponding to each pixel in the two-dimensional image data;
generating, by inputting the extracted feature data to a set of fully connected layers of the CNN, a set of classification probabilities and a set of three-dimensional bounding box coordinates, the set of classification probabilities and the set of three-dimensional bounding box coordinates comprising an output from the set of fully connected layers;
generating, by inputting the extracted feature data to a set of fully connected layers of the CNN, a set of classification probabilities and a set of three-dimensional bounding box coordinates, the set of classification probabilities and the set of three-dimensional bounding box coordinates comprising an output from the set of fully connected layers;
determining that reorientation of one or more of the camera device and the point cloud capture device is required based upon a threshold value;
computing reorientation information instructing one or more of the camera device and the point cloud capture device to reorient to a different capture angle; and
causing, using the reorientation information, the one or more of the camera device and the point cloud capture device to reorient to a different capture angle.

6. The computer usable program product of claim 5, further comprising:
forming, by clustering pixels of the set of three-dimensional bounding box coordinates, a segmented object.

7. The computer usable program product of claim 6, further comprising:
estimating, based upon a distance between extreme points in the image data, an object size of the segmented object.

8. The computer usable program product of claim 7, further comprising:
  computing, using the object size, path information for an automotive control subsystem, the path information enabling the automotive control subsystem to avoid the physical object.

9. The computer usable program product of claim 5, wherein the computer usable code is stored in a computer readable storage device in a data processing system, and wherein the computer usable code is transferred over a network from a remote data processing system.

10. The computer usable program product of claim 5, wherein the computer usable code is stored in a computer readable storage device in a server data processing system, and wherein the computer usable code is downloaded over a network to a remote data processing system for use in a computer readable storage device associated with the remote data processing system.

11. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions when executed by a processor causing operations comprising:
  determining, by analyzing two-dimensional image data of a scene received from a camera device, an area of interest within the scene, the two-dimensional image data comprising red-green-blue (RGB) pixel information at a set of two-dimensional pixel coordinates, the two-dimensional image data captured at a first time from a first frame of reference;
  capturing, using a point cloud capture device at a second time later than the first time, from a second frame of reference, point cloud data of the area of interest, the point cloud data comprising a set of three-dimensional physical point coordinates of a physical object in the area of interest;
  transforming, using a transformation, three-dimensional physical point coordinates of the point cloud data to corresponding pixel coordinates of the two-dimensional image data, the transformation accounting for a difference between the first time and the second time and a difference between the first frame of reference and the second frame of reference, the transforming generating depth data for a subset of the two-dimensional image data;
  performing a bilinear interpolation of the depth data from pixels in the subset of the two-dimensional image data to each pixel in the two-dimensional image data, the bilinear interpolation generating RGBD image data comprising the two- dimensional image data and depth data corresponding to each pixel in the two-dimensional image data;
  generating, by inputting the RGBD image data to a set of convolutional layers of a convolutional neural network (CNN), extracted feature data, the extracted feature data comprising an output from the set of convolutional layers;
  generating, by inputting the extracted feature data to a set of fully connected layers of the CNN, a set of classification probabilities and a set of three-dimensional bounding box coordinates, the set of classification probabilities and the set of three-dimensional bounding box coordinates comprising an output from the set of fully connected layers;
  determining that reorientation of one or more of the camera device and the point cloud capture device is required based upon a threshold value;
  computing reorientation information instructing one or more of the camera device and the point cloud capture device to reorient to a different capture angle; and
  causing, using the reorientation information, the one or more of the camera device and the point cloud capture device to reorient to a different capture angle.

12. The computer system of claim 11, further comprising:
  forming, by clustering pixels of the set of three-dimensional bounding box coordinates, a segmented object.

13. The computer system of claim 12, further comprising:
  estimating, based upon a distance between extreme points in the image data, an object size of the segmented object.

14. The computer system of claim 13, further comprising:
  computing, using the object size, path information for an automotive control subsystem, the path information enabling the automotive control subsystem to avoid the physical object.

* * * * *